United States Patent
Claussen et al.

(10) Patent No.: US 7,729,839 B2
(45) Date of Patent: Jun. 1, 2010

(54) AUTOMATED INTER-AXLE DIFFERENTIAL LOCK SENSOR CONFIGURATION AND CALIBRATION METHOD

(75) Inventors: Stephen P. Claussen, Richland, MI (US); James A. Beverly, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 908 days.

(21) Appl. No.: 11/544,476

(22) Filed: Oct. 6, 2006

(65) Prior Publication Data
US 2008/0085803 A1    Apr. 10, 2008

(51) Int. Cl.
B60K 23/04    (2006.01)
G01P 3/56    (2006.01)

(52) U.S. Cl. .............................. 701/69; 702/91; 702/145

(58) Field of Classification Search .................... 701/51, 701/69; 702/90, 91, 145–148
See application file for complete search history.

(56) References Cited

U.S. PATENT DOCUMENTS

| | | | |
|---|---|---|---|
| 4,947,325 A * | 8/1990 | Iwata et al. | 701/34 |
| 5,927,422 A | 7/1999 | Schakel | |
| 2006/0036361 A1 | 2/2006 | Romer | |
| 2006/0154787 A1 | 7/2006 | Claussen | |
| 2006/0172852 A1 | 8/2006 | Claussen | |
| 2006/0175113 A1 | 8/2006 | Rodeghiero | |

FOREIGN PATENT DOCUMENTS

| | | |
|---|---|---|
| EP | 1679219 A1 | 7/2006 |
| EP | 1688294 A2 | 8/2006 |
| EP | 1690728 A1 | 8/2006 |
| GB | 1468489 A | 3/1977 |

* cited by examiner

*Primary Examiner*—Thomas G Black
*Assistant Examiner*—Peter D Nolan
(74) *Attorney, Agent, or Firm*—Marshall & Melhorn, LLC

(57) ABSTRACT

The present invention relates to an automatic inter-axle differential sensor configuration (i.e., location) and calibration method for a vehicle having a tandem drive axle. The method involves determining the speed of the vehicle, determining pulses per minute from each inter-axle differential sensor via the vehicle electronic control unit (ECU), where each of the inter-axle differential sensors are connected to an inter-axle differential gear, determining a location of each inter-axle differential sensor from each of the inter-axle differential sensor pulses per minute, and assigning a number of teeth to each of the inter-axle differential gears in calibrating each of the inter-axle differential sensors. The revolutions per minute for each of the inter-axle differential sensors may be utilized to lock the inter-axle differential during slippage of the vehicle, without human intervention.

7 Claims, 10 Drawing Sheets

AUTOMATED INTER-AXLE DIFFERENTIAL LOCK SENSOR CONFIGURATION AND CALIBRATION METHOD

FIELD OF THE INVENTION

The present invention relates to inter-axle differential lock sensors.

BACKGROUND OF THE INVENTION

Tandem drive axle assemblies having a forward rear axle and a rearward rear axle in proximity with each other are well known. Such tandem drive assemblies are widely used on heavy duty trucks and other over-the-road vehicles, such as busses, which have a high vehicle weight and/or a high load carrying capacity. In such assemblies, both rear axles may be power driven.

An inter-axle differential (IAD) is commonly employed in such vehicles to split the input shaft torque between the front and rear axle of the tandem drive axle assemblies. It is common for an operator of such vehicles to engage and disengage a lock out that overrides or disables the IAD through the use of a pneumatic switch, which typically is mounted on the vehicle dash. In turn, the pneumatic switch applies air to an axle mounted actuator, which engages a sliding dog clutch to "lock" the inter-axle differential.

However, there are several shortcomings to the above-described manual methods of engaging/disengaging the IAD. Failure of the vehicle operator to notice wheel end slip occurring and engage the IAD, can result in spin out failures. Also, engagement of the IAD, while significant slipping is in process, can result in damage to the drive axle. Leaving the IAD engaged for an extended length of time can result in "drive line wind-up" and a resulting inability to disengage the IAD without reversing the vehicle. As a result of these shortcomings, extended wear can occur and the operator may not notice the wear, as actual engagement and disengagement of the IAD is not typically indicated.

Recently, automatic inter-axle differential lockout mechanisms have come into use, where typically two speed sensors (i.e., associated with an IAD clutch locking gear and an IAD helical gear) have been employed to monitor IAD gear speed (see, for example, U.S. Patent Application Publication No. 2006/0154787 to Claussen et al., which is incorporated herein). For such an IAD lockout mechanism to function properly, the mechanism must separately identify each speed sensor. Hence, it is common to specifically wire between the speed sensors and a control unit by way of different harness connectors, plugs, keys, etc., and to specifically install different sensors so that the sensors cannot be wired the same and/or communicated with through the same signals to the control unit. It is also common that for calibrating each of the gears used in the IAD, the correct combination of the number of teeth for each gear needs to be determined manually and in advance of utilization of the gears, in order to correctly calculate revolutions per minute (RPM) of the gears being monitored.

Examples of relevant art involving inter-axle differential lockout mechanisms are as follows. U.S. Pat. No. 5,927,422 to Schakel generally discloses a system for correcting drive wheel slippage in a heavy vehicle. A central processor compares the driveshaft speed to a non-driven wheel speed and locks an inter-axle differential of a tandem rear drive axle to drive front and rear drive axles at the same speed. If necessary, the inter-axle differential may alternatively lock a main differential of a single rear drive axle to drive first and second driven wheels at the same speed when the ratio of the driveshaft speed signal to a first non-driven wheel speed signal exceeds a predetermined limit. In a tandem configuration, if drive wheel slippage continues, main differentials of the front and rear drive axles are also locked.

U.S. Patent Application Publication No. 2006/0036361 to Romer teaches a drivetrain protection and management system that monitors and determines individual wheel speeds to detect wheel spin and slip conditions on a drive axle. When wheel spin or slip exceeds a threshold, the system automatically controls input torque to the drive axle by controlling engine or retarder torque. In addition to monitoring wheel speeds, the system monitors other vehicle characteristics such as engine torque/speed, the transmission ratio speed, transmission output speed, vehicle speed, and throttle position.

U.S. Patent Application Publication No. 2006/0175113 to Rodeghiero teaches a vehicle that includes steerable front wheels and an interaxle differential for transmitting torque from an engine to the front wheels and to rear wheels. The differential includes a controllable clutch operable to control a ratio of front wheel speed to rear wheel speed, while a control unit controls the clutch as a function of sensed steering angles and stored information including steering angles and corresponding front to rear wheel speed ratio values. The control unit, which is automatically calibrated, periodically obtains steering angle values and front and rear wheel speed values, it generates new front to rear wheel speed ratio values, and replaces one of the stored front to rear wheel speed ratio values with one of the new ratio values, if the steering angle values indicate that the vehicle has been in a straight ahead travel mode for at least a certain time period.

In contrast to the above cited relevant art, the present invention seeks to automatically determine the configuration (e.g., location of the IAD clutch locking gear and the IAD helical gear) of the IAD sensors and to automatically determine the correct combination of the number of teeth in each of the IAD gears so that each of the IAD sensors can be automatically calibrated. The present invention further seeks to not require the exact wires between the ECU sensor inputs and the IAD sensor terminals to be connected to each other, thus precluding the possibility of the sensors being installed at the wrong locations. As a result, the present invention seeks to reduce installation and maintenance complexity, along with reducing costs by not requiring separate connectors, identification, and sensors.

SUMMARY OF THE INVENTION

The present invention relates to an automatic inter-axle differential sensor configuration and calibration method, for a vehicle having a tandem drive axle, that comprises determining pulses or pulses per minute from each inter-axle differential sensor by way of the vehicle electronic control unit (ECU), where each inter-axle differential sensor is connected to an inter-axle differential gear, determining a location of each inter-axle differential sensor from each of the inter-axle differential sensor pulses or pulses per minute, and assigning a number of teeth per inter-axle differential sensor in calibrating each of the inter-axle differential sensors.

The method may further comprise determining the speed of the vehicle, converting the pulses or pulses per minute to revolutions per minute of each of the inter-axle differential sensors, and utilizing the revolutions per minute of each of the inter-axle differential sensors to automatically lock an inter-axle differential during slippage of the vehicle, without human intervention.

Further advantages of the present invention will be apparent from the following description and appended claims, reference being made to the accompanying drawings forming a part of a specification, wherein like reference characters designate corresponding parts of several views.

DETAILED DESCRIPTION OF THE INVENTION

It is to be understood that the present invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
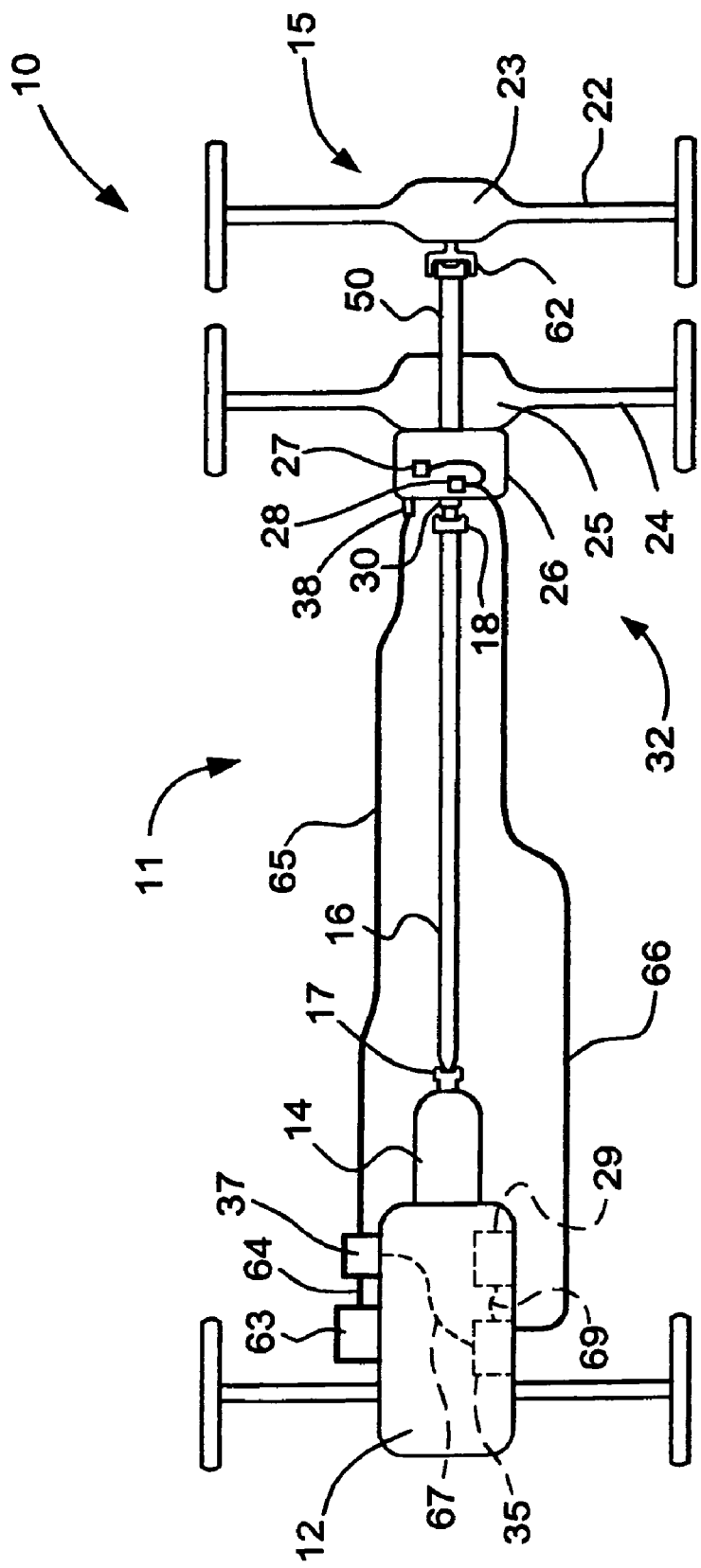
FIG. 1 is a schematic of a top-plan view of a vehicle in accordance with the present invention.

In general, the present invention involves the use of an automatic inter-axle differential (IAD) locking system 10 for a vehicle 11 having a tandem drive axle assembly 15, as illustrated in FIG. 1. The vehicle 11 has an engine 12, which is drivingly connected to a transmission 14. A main drive shaft 16 extends longitudinally from the transmission 14 to the tandem axle assembly 15, and may be coupled at one end via a conventional coupling 17, such as a yoke or a universal joint, to the transmission 14, and at the other end by another conventional coupling 18 to an input shaft 30 of the tandem drive axle assembly 15.

Vehicle 11 may be any vehicle having a tandem drive axle assembly, such as a truck, bus or other over-the-road vehicle which has a tandem drive axle assembly comprising two axially spaced axles. The tandem drive axle assembly 15 is usually located near the rear of a vehicle and may, therefore, be referred to herein as a tandem drive rear axle assembly. The tandem drive rear axle assembly 15 comprises a rearward rear axle 22, which in turn comprises axially aligned right and left axle shafts (not shown), which are driven through an axle differential 23. In addition, a forward rear axle 24 also comprises axially aligned right and left axle shafts (not shown), which are driven through an axle differential 25. The axles 22 and 24 of the tandem rear axle assembly 15 herein are axially spaced apart but are in proximity with each other toward the rear of the vehicle 11.

All parts of both the vehicle 11 as a whole and the tandem rear axle assembly 15 described so far may be conventional. Thus, the two axle differentials 23 and 25 may be conventional. In the following discussion, FIGS. 2-9 illustrate a particular inter-axle assembly, a particular microprocessor, and a particular clutch lock mechanism of the '787 U.S. Publication mentioned earlier, which are utilized as an example for the present invention. The present invention is not limited by the inter-axle assembly of item 20, the microprocessor of item 35, and the clutch lock mechanism of item 32 and may be practiced utilizing other IAD assemblies.

Figure 2:
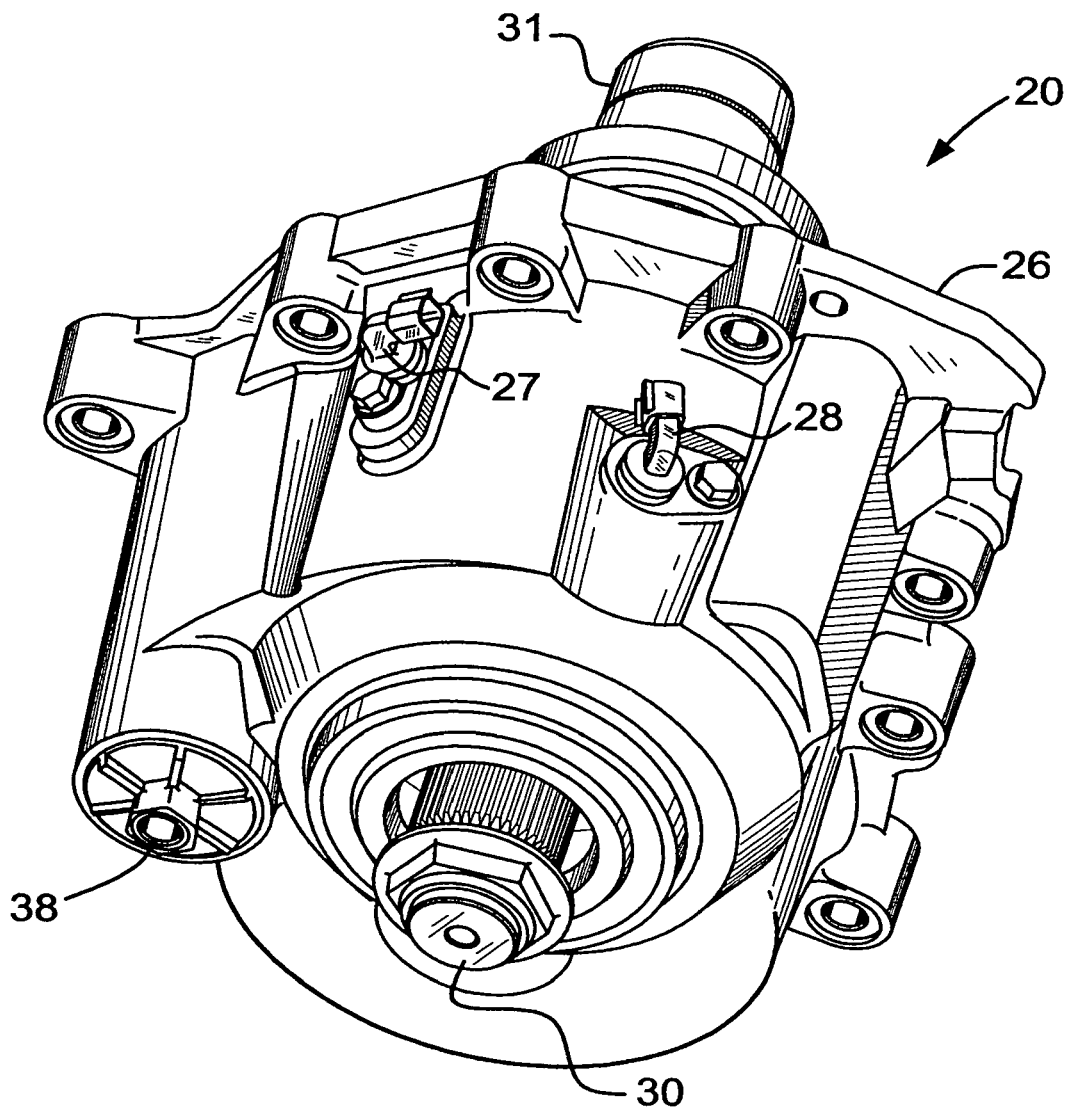
FIG. 2 is a three dimensional view of an inter-axle differential in accordance with U.S. Patent Application Publication No. 2006/0154787.

FIG. 2 illustrates a tandem inter-axle assembly 20 having a housing 26 at its forward end to rotatably support a longitudinally extending input shaft 30, which may be axially aligned with the vehicle drive shaft 16. The forward end of input shaft 30 is coupled to vehicle drive shaft 16 in direct drive relationship by means of the coupling 18. The input shaft 30 is received in the inter-axle differential 20 for transmitting input torque from the vehicle drive shaft to the inter-axle differential 20. Also shown in FIG. 2 are an inter-axle output shaft 31 that consequently transmits torque to the rearward rear axle 22 (via an output drive shaft 50 and a rearward coupling 62, and the rear axle differential 23 as shown in FIG. 1), a rotating side helical gear speed sensor 27, and a rotating sliding clutch lock speed sensor 28. The sensors 27, 28 may be conventionally available sensors, for example, Dana Corporation part number 673425 and/or Wabash part number 9184.

Figure 3:
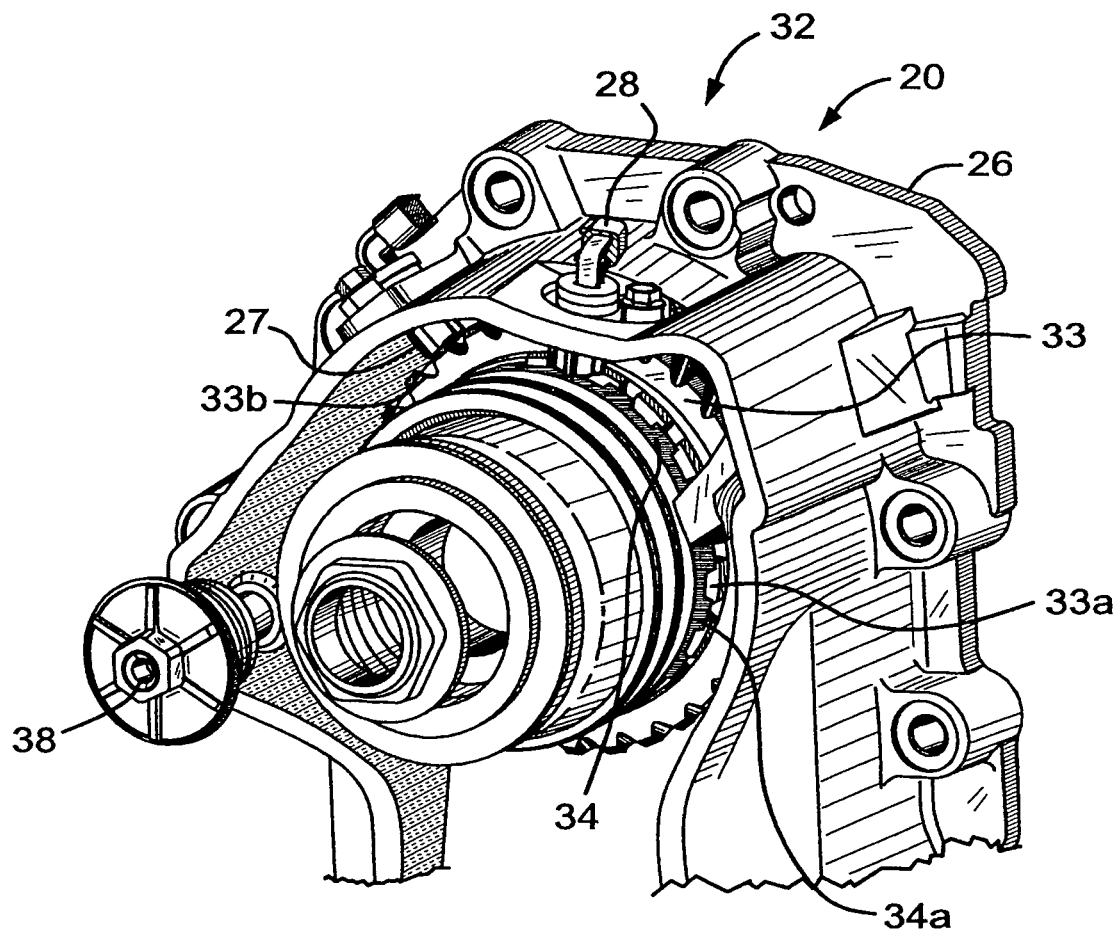
FIG. 3 is a partial cut-away of the inter-axle differential of FIG. 2.

As illustrated in FIG. 3, the vehicle IAD 20 further comprises a clutch locking mechanism 32 that includes a rotating side helical gear 33 and a rotating sliding clutch 34. In FIG. 3, the sliding clutch lock mechanism 32 is engaged and subsequently locked, where locked is defined as helical gear teeth 33a and sliding clutch teeth 34a being in a meshing relationship. Note that the helical gear teeth 33a are in a fixed position.

Figure 4:
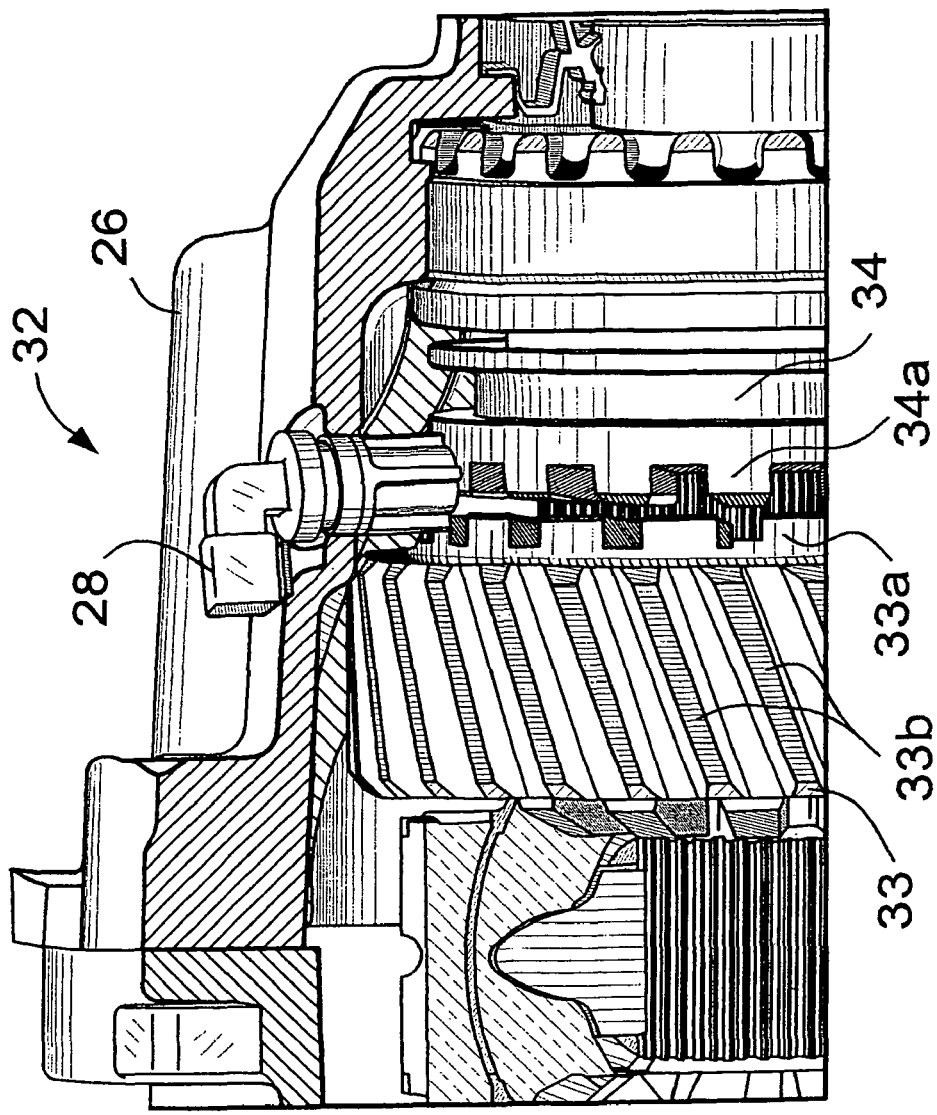
FIG. 4 is a partial cut-away of the three dimensional view of the inter-axle differential of FIG. 2.
Figure 5:
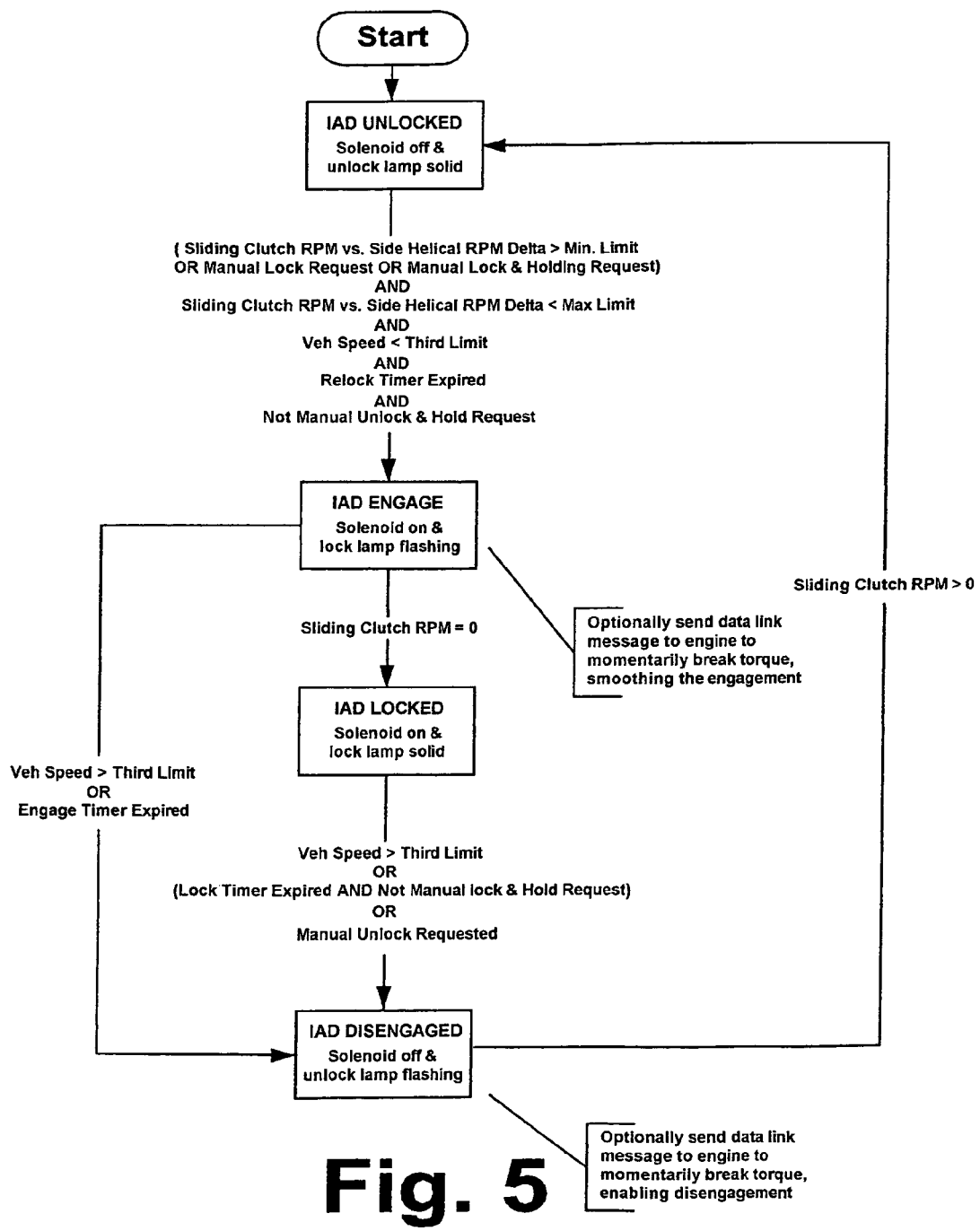
FIG. 5 is a flow chart of the logic in accordance with the '787 U.S. Publication.

On the other hand, FIG. 4, which is a partial cut-away view of the cover 26 of the inter-axle differential 20 of FIG. 2 that is taken near to the sliding clutch sensor 28, illustrates the sliding clutch lock mechanism 32 being disengaged (a.k.a., unlocked), where the helical gear teeth 33a of the rotating side helical gear 33 and the teeth 34a of the sliding clutch 34 are separated.

Also illustrated in FIG. 4 is the alignment of the sliding clutch speed sensor 28 over the teeth 34a of the sliding clutch 34. When the sliding clutch lock mechanism 32 is disengaged, the sliding clutch speed sensor 28 measures a speed of the sliding clutch 34 by sensing a presence of and then an absence of the rotating teeth 34a of the clutch 34 passing below the sliding clutch speed sensor 28. Thus, the sliding clutch speed sensor 28 (via first electrical means 66 shown in FIG. 1) provides a sliding clutch pulses (that get converted to pulses per minute (PPM)) to a microprocessor 35 (see FIGS. 6-7, for example, Motorola MC9S12D64 or equivalent at POLE SENSOR INPUT #1/#2 in FIG. 6). The PPM signal is converted to the speed in revolutions per minute of the sliding clutch 34, when the gear 33 and the clutch 34 are disengaged. However, for this example, when the clutch mechanism 32 is fully engaged (as in FIG. 3) the sensor 28 measures zero sliding clutch speed even though the sliding clutch 34 continues to rotate.

Figure 6:
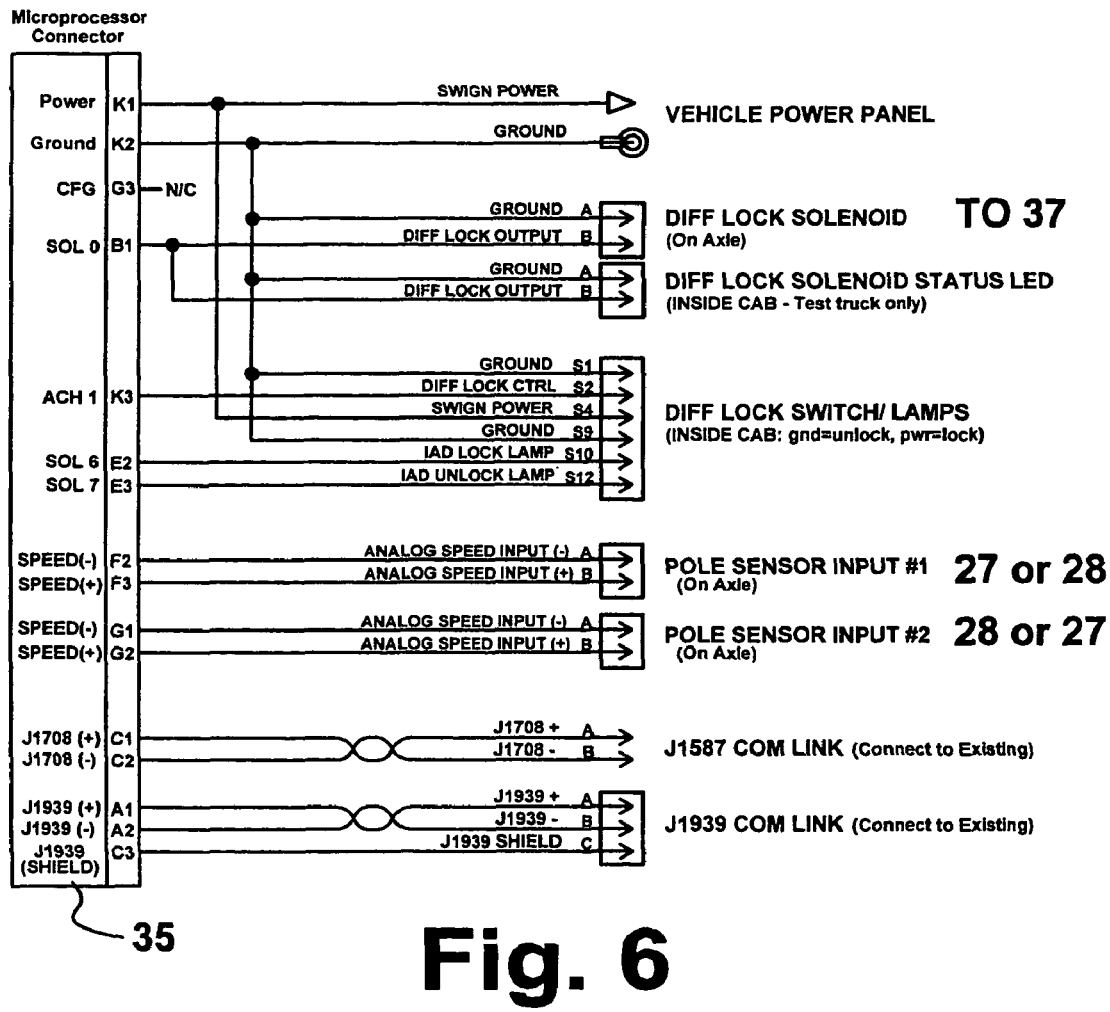
FIG. 6 is an electrical connector diagram in accordance with the present invention.

The helical gear speed sensor 27, shown in FIG. 3, provides the helical gear pulse to the microprocessor 35 for determining the PPM that are converted to speed in revolutions per minute of the helical gear 33 by sensing the presence of and absence of second helical gear teeth 33b, which provides a helical gear/sensor pulses to the microprocessor 35 (see POLE SENSOR INPUT #1/#2 in FIG. 6). When the gear 33 and the clutch 34 are locked, the sliding clutch speed sensor 28 no longer senses the presence of and then the absence of the teeth 34a.

It can be appreciated by one skilled in the art that the speed of the vehicle 11 may be obtained from the vehicle communication data link, for example, J1587 COMM LINK or J1939 COMM LINK (see FIGS. 6 and 7), which follow the standards set by the Society of Automotive Engineers (SAE). It can further be appreciated that the present invention is not limited by the first electrical means 66 and/or a second electrical means 69 (for example, wires, connectors, printed circuit board tracks, or cables, which could include any present or future SAE COMM LINKS), solenoid 37, particular sensors 27, 28, particular microprocessor 35, or any particular engine electronic control unit (ECU) 29 (see FIG. 1). Although the microprocessor 35 may be separate from the ECU 29, as illustrated in FIG. 1, the microprocessor 35 is most likely disposed in the ECU 29 and the second electrical means 69 are printed circuit board tracks.

Figure 10:
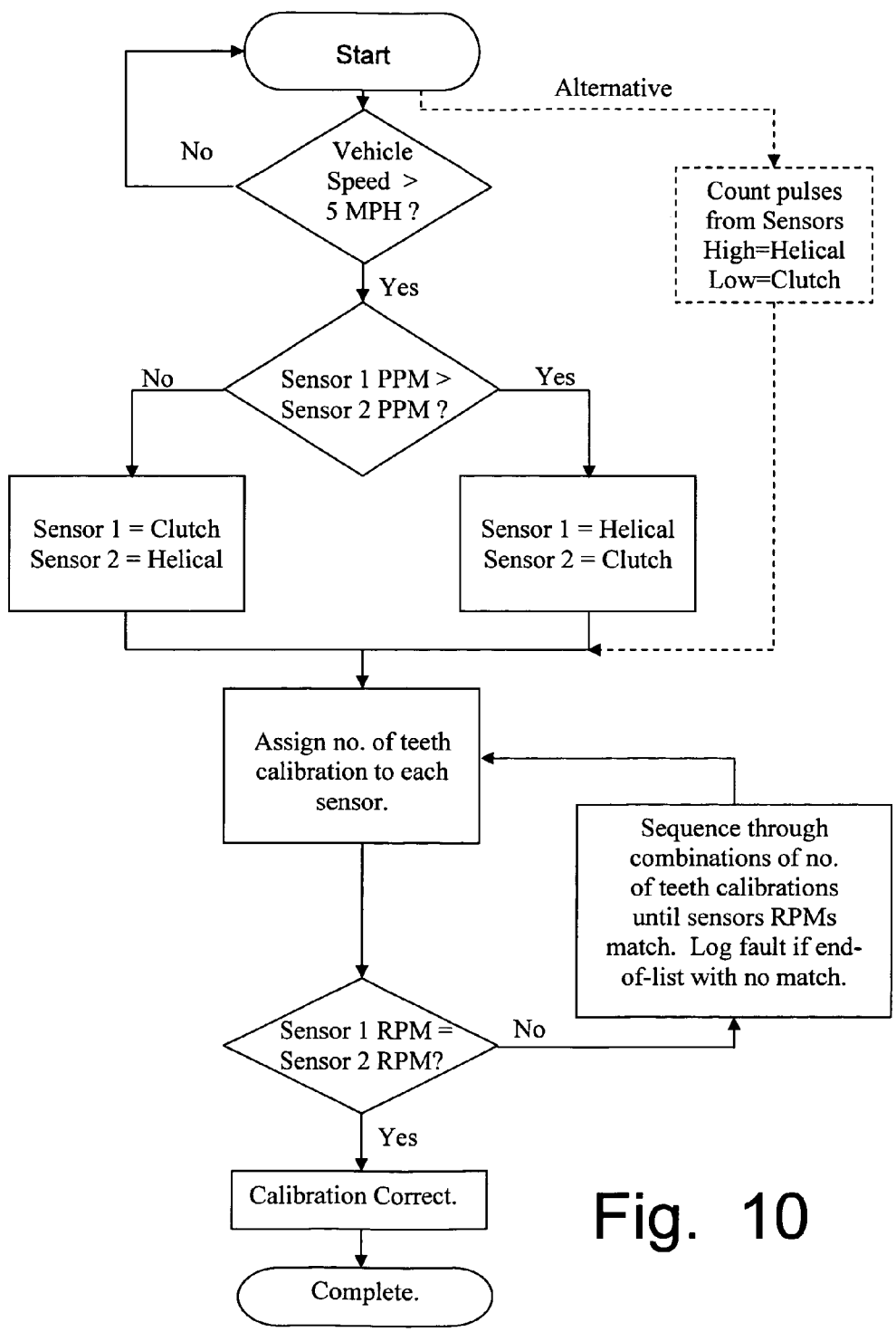
FIG. 10 is a flow chart of the logic associated with determining the location and calibration of sensors in accordance with the present invention.

Referring to FIG. 10, there is shown a flow chart of logic that is a discovery of the instant invention. Upon turning on the ignition of the vehicle 11, the vehicle communication data link commences communicating by providing the speed of the vehicle 11 to the ECU 29. If the vehicle speed is not greater than 5 miles per hour (MPH) then the ECU 29 waits until the speed is greater than 5 MPH. When the vehicle speed exceeds 5 MPH, the PPM from the data link at POLE SENSOR INPUT #1 is compared to POLE SENSOR INPUT #2, and if #1 is not greater that #2, then the sensor associated with #1 (called Sensor 1 in FIG. 10) is the clutch sensor and, therefore, Sensor 2 is the helical sensor. Otherwise, when the PPM of Sensor 1 is higher than the PPM of Sensor 2, then the Sensor 1 is the helical sensor 33 and Sensor 2 is the clutch sensor 34.

An alternative approach (see dashed line alternative in FIG. 10) to the above described speed level determination/pulse PPM count steps is to recognize that the side helical gear 33 has more teeth than the sliding clutch 34, therefore, the sensor associated with the side helical gear 33 has a higher PPM value than the sliding clutch 34—assuming no slippage at low vehicle speeds. In utilizing this alternative approach, the pulses from each sensor 33,34 are counted by the ECU 29 until one of the sensors 33,34 exceed a predetermined limit (e.g., 1000). Then, the sensor with the higher count is considered to be the helical sensor 33 and the one with the lower count is considered to be the sliding clutch 34.

By either approach, the present invention distinguishes between and knows the location (defined herein as the configuration) of the IAD lock sensors (i.e., the clutch locking gear 34 and the helical gear 33), by way of the ECU 29.

Further, the ECU 29 sequences through a predetermined assignment (for example, from a look-up table associated with potential gears) of a number of teeth for each combination of possible gears 33,34, while comparing the RPMs received from the data link for each sensors 27,28 associated with those gears 33,34. If the ECU 29 finds a match where the RPMs are equal for the assigned number of teeth for that combination of gears, then the ECU 29 has calibrated the gears 33,34 and the operation is complete. If, by such means, the ECU 29 does not find a match then the ECU 29 indicates a fault, possibly in the form of a display or a warning lamp on the vehicle's dashboard. A possible cause for not finding a match between the gears could be due to an installation of non-standard gearing.

Again referring to the example disclosed in the '787 U.S. Publication but not limited thereto, upon start up of the automatic IAD lock system 10, an engaged solenoid 37 (see FIG. 6 for inputs and outputs associated with the solenoid 35 and various lamps and LEDs) is turned off and an "unlock lamp" is turned on solid in the vehicle compartment to indicate to the operator of the vehicle 11 that the clutch mechanism 32 is unlocked.

Figure 7:
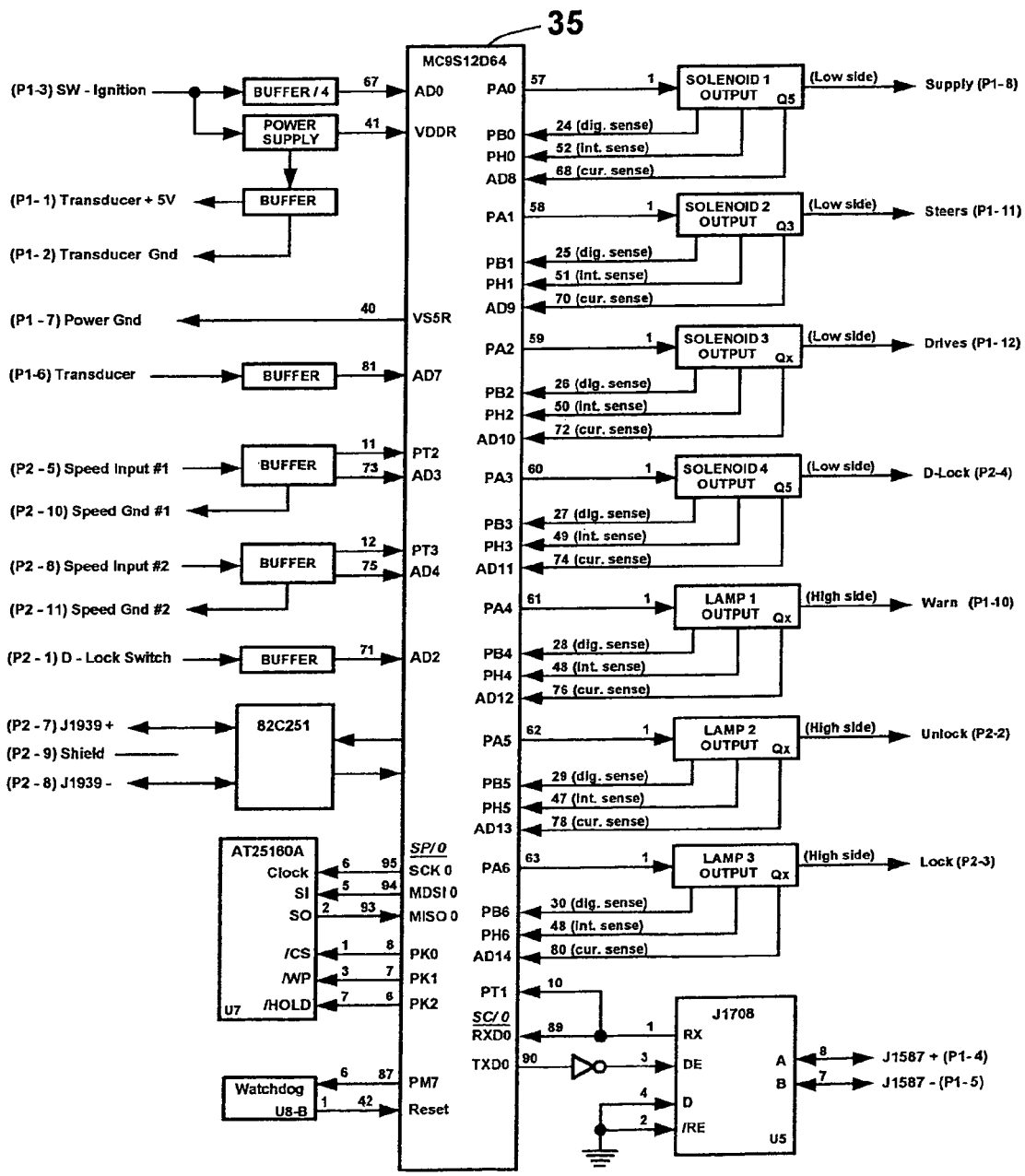
FIG. 7 is an electrical schematic of a microprocessor in accordance with the present invention.

The system 10, through the aid of the microprocessor 35, then determines (see FIG. 5, which details the following logic that is in accordance with the '787 U.S. Publication) if the mathematical absolute difference between the sliding clutch 34 revolutions per minute and the side helical gear revolutions per minute is greater than a minimum limit, and if the mathematical absolute difference between the sliding clutch revolutions per minute and the side helical gear revolutions per minute is less than a maximum limit, and the speed of the vehicle, which is obtained from the vehicle communication data link (for example, comm. link J1587 or comm. link 1939 as illustrated in FIGS. 6-7) of the electronic controls in engine 12, is less than a third limit, and a relock timer has expired, and no manual unlock and hold has been requested. If all of these conditions are met, then the system 10 causes the inter-axle differential clutch mechanism 32 to commence engagement by turning on the engage solenoid 37, by turning on an engage timer, and causes a "lock" lamp to flash on and off.

While in the IAD engage mode, the system 10 monitors the vehicle speed so as to determine if the vehicle speed is greater than the third limit. If the vehicle speed is greater than the third limit or if the engage timer has expired, then the system disengages the IAD 20, which includes turning off the engage solenoid 37, and causes the unlock lamp to flash on and off.

Figure 8:
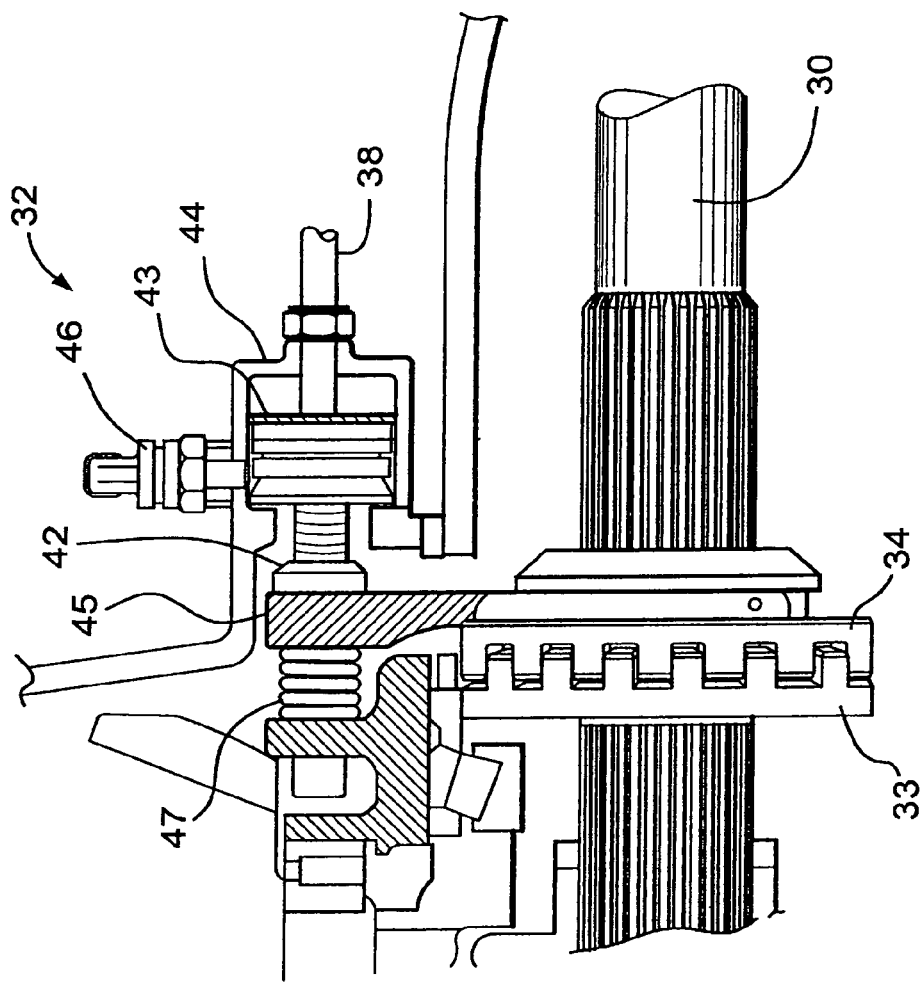
FIG. 8 is a side view of an engaged inter-axle differential in accordance with the '787 U.S. Publication.
Figure 9:
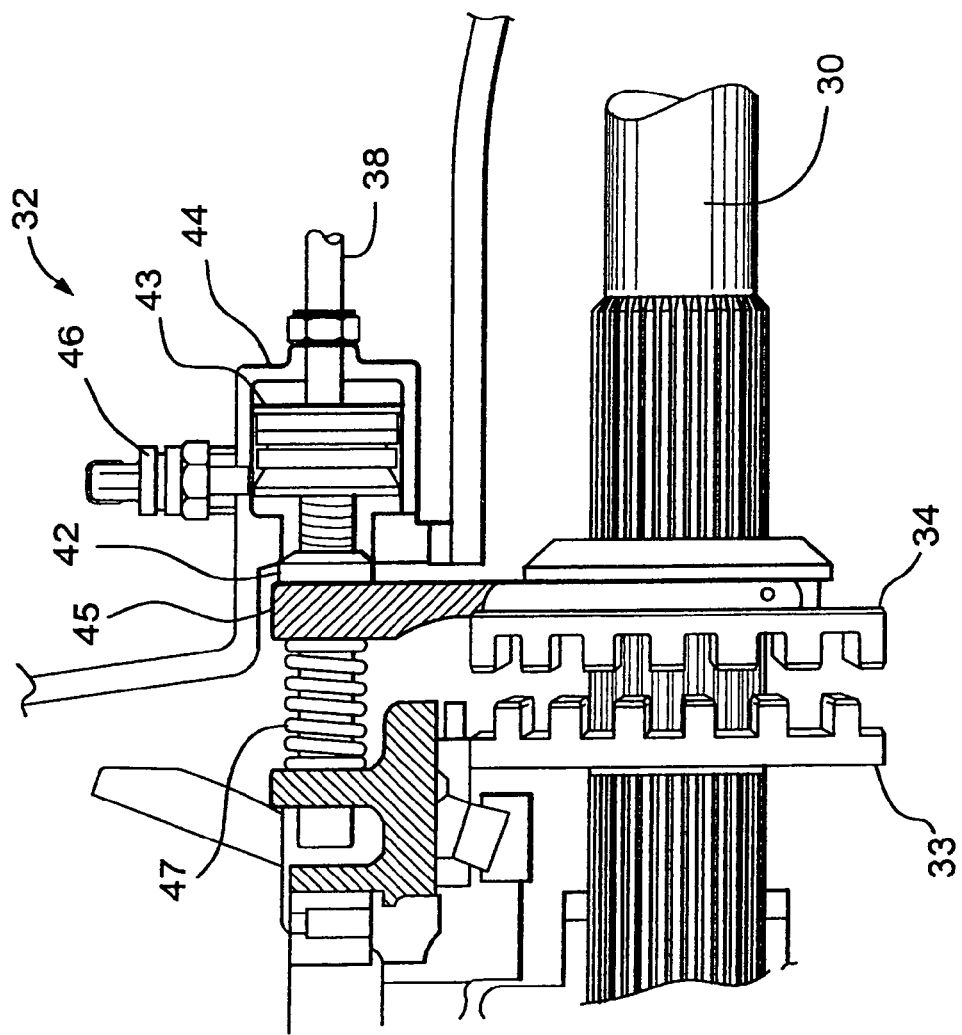
FIG. 9 is a side view of a disengaged inter-axle differential in accordance with the '787 U.S. Publication.

Note that the engage solenoid 37 may be located anywhere in/on the vehicle where it will not be damaged. The solenoid 37 controls pressurized air flow through the port 38 (see FIGS. 2 and 3). As shown in FIGS. 8 and 9 the air causes the inter-axle differential clutch mechanism 32, which may also include various other elements (push rod 42, piston 43, shift cylinder 44, shift fork 45, selector switch 46 (used in a manual control versus the microprocessor 35 control of the present invention), and spring 47) to engage (FIG. 8) or disengage (FIG. 9). As FIGS. 8-9 conventionally illustrate, the air flow is controlled by the selector switch 46, but a separate solenoid 37 may be utilized to allow pressurized air to enter or not to enter port 38, which subsequently causes the fork 45 to shift the sliding clutch 34.

While in an IAD disengage mode, the system 10 monitors the sliding clutch RPM so as to determine if the sliding clutch 34 is greater than zero (i.e., the teeth 33a, 34a are no longer meshed). If the sliding clutch RPM is greater than zero, then the system 10 returns the IAD 20 to the unlocked mode, as discussed above, where the engage solenoid 37 remains off and the "unlock lamp" is turned on solid in the vehicle compartment to indicate to the operator of the vehicle 11 that the clutch mechanism 32 is unlocked.

Returning to FIG. 1, there is illustrated the interconnection of various electrical and pneumatic parts that are described above. The microprocessor 35 is electrically connected to the sensors 27, 28 by the first electrical means 66, and the microprocessor 35 is electrically connected to the solenoid 37 by third electrical means 67. Although shown located within the engine 12, it is within the spirit and scope of the present invention that the microprocessor 35 could be located elsewhere. A source of compressed air 63 is pneumatically connected to the solenoid 37 by first pneumatic means 64, while the solenoid 37 would also be pneumatically connected by second pneumatic means 65 to the compressed air port 38, for controlling the engagement/disengagement of the clutch mechanism 32. The source of compressed air 63 could be a separate source or a part of the engine 12.

FIGS. 6 and 7 illustrate various embodiments of electrical connection between the microprocessor 35, the inputs and outputs (for example, 27, 28, 37 (via the first electrical means 66), and various conventional lamps/LEDs) for the system 10. It may be appreciated that the system 10 is not limited by the lamps, LEDs, solenoids, and/or the pneumatic means to cause air to flow to the shift fork that causes engagement, disengagement, and locking of the locking mechanism 32.

FIG. 6 illustrates the microprocessor 35 connections to inputs and outputs (for example, 27, 28, 37, and various conventional lamps/LEDs) for the system 10. For the present invention, the system 10 is not limited by the lamps, LEDs, solenoids, the pneumatic means to cause air to flow to the shift fork 45 that causes engagement and disengagement of the locking mechanism 32.

As can be seen from the above discussion, the present invention automatically determines the configuration (i.e., location) of the IAD sensors and automatically determines the correct combination of the number of teeth in each of the IAD gears so that each of the IAD sensors can be automatically calibrated. The present invention does not require exact wires between the ECU sensor inputs and the IAD sensor terminals to be connected to each other, thus precluding the possibility of the sensors being installed at the wrong locations. As a result, the present invention seeks to reduce installation and maintenance complexity, along with reducing costs by not requiring separate connectors, identification, and sensors.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. An automatic inter-axle differential sensor configuration and calibration method for a vehicle having a tandem drive axle, comprising:
   determining pulses per minute from each of a plurality of inter-axle differential sensors by way of a vehicle electronic control unit, each of said inter-axle differential sensors sensing a separate inter-axle differential gear;
   determining a location of each of said inter-axle differential sensors from each of said inter-axle differential sensor pulses per minute; and
   assigning a number of teeth to each of said inter-axle differential gears in calibrating each of said inter-axle differential sensors.

2. The inter-axle differential sensor configuration and calibration method of claim 1, further comprising:
   determining a speed of said vehicle;
   converting said pulses per minute to revolutions per minute for each of said inter-axle differential sensors; and
   utilizing said revolutions per minute of each of said inter-axle differential sensors to lock an inter-axle differential during slippage of said vehicle.

3. An automatic inter-axle differential sensor configuration and calibration method for a vehicle having a tandem drive axle, comprising:
   counting pulses from each of two inter-axle differential sensors by way of a vehicle electronic control unit, each of said inter-axle differential sensors sensing a separate inter-axle differential gear;
   determining a location of each of said inter-axle differential sensors from each of said inter-axle differential sensor pulses, wherein the highest number of pulses is from a helical gear and the lowest number of pulses is from a clutch locking gear; and
   assigning a number of teeth to each of said inter-axle differential gears in calibrating each of said inter-axle differential sensors.

4. The inter-axle differential sensor configuration and calibration method of claim 3, further comprising:
   converting said pulses to revolutions per minute for each of said inter-axle differential sensors; and
   utilizing said revolutions per minute of each of said inter-axle differential sensors to lock an inter-axle differential during slippage of said vehicle.

5. An automatic inter-axle differential sensor configuration and calibration method for a vehicle having a tandem drive axle, comprising:
   determining a speed of said vehicle and comparing said speed of said vehicle to a predetermined miles per hour limit;
   determining pulses per minute from each of two inter-axle differential sensors;
   locating each of said inter-axle differential sensors from each of said inter-axle differential sensor pulses per minute, the higher pulses per minute being from a helical gear and the lower pulses per minute being from a clutch locking gear;
   assigning a number of teeth to each of said inter-axle differential gears;
   converting said pulses per minute to revolutions per minute for each of said inter-axle differential sensors; and
   calibrating said inter-axle differential gears by equating revolutions per minute for said inter-axle differential gears.

6. The inter-axle differential sensor configuration and calibration method of claim 5, further comprising utilizing said revolutions per minute of each of said inter-axle differential sensors to lock an inter-axle differential during slippage of said vehicle.

7. The inter-axle differential sensor configuration and calibration method of claim 5, wherein said predetermined miles per hour limit is five miles per hour.

* * * * *